United States Patent [19]
Van Gilst

[11] Patent Number: 5,832,875
[45] Date of Patent: Nov. 10, 1998

[54] PIG RAISING APPARATUS WITH HEATED CUDDLE AND COMFORT SURFACES

[75] Inventor: Carl W. Van Gilst, Goshen, Ind.

[73] Assignee: Agri-Engineering, Inc., Goshen, Ind.

[21] Appl. No.: 518,290

[22] Filed: Aug. 23, 1995

[51] Int. Cl.⁶ .................................................. A01K 1/02
[52] U.S. Cl. ............................................................ 119/508
[58] Field of Search ................................. 119/503, 504, 119/508, 509

[56] References Cited

U.S. PATENT DOCUMENTS

| | | |
|---|---|---|
| 1,309,071 | 7/1919 | Johnson . |
| 1,317,516 | 9/1919 | McGrath ............................. 119/508 X |
| 1,737,211 | 11/1929 | Barker . |
| 3,028,097 | 4/1962 | Johnson ............................. 119/508 X |
| 3,181,503 | 5/1965 | Tripp ....................................... 119/508 |
| 4,256,057 | 3/1981 | Herring . |
| 4,348,986 | 9/1982 | Marrs ...................................... 119/508 |

FOREIGN PATENT DOCUMENTS

| | | | |
|---|---|---|---|
| 56336 | 7/1982 | European Pat. Off. ............... | 119/508 |
| 3403930 | 8/1985 | Germany ............................... | 119/508 |

*Primary Examiner*—Robert P. Swiatek
*Attorney, Agent, or Firm*—Wendell E. Miller Patent Agent

[57] ABSTRACT

Apparatus (10) for use in enticing baby pigs (42) to rest and sleep at a safe distance from a sow (38) includes an elongated partition (12) with first and second elongated cuddle surfaces (16) that are disposed on opposite sides of the partition (12), first and second pig blankets (18) with first and second comfort surfaces (44). A base mat (20) that extends under the partition (12) and both pig mats (18), cooperates with cuddle walls (14) of the partition (12) to enclose a space (26) that extends below both pig mats (18) and their comfort surfaces (44), and between the cuddle walls (14) and their cuddle surfaces (16). One or more radiant panel heaters (46 or 52) having constant watt density per square meter are disposed in the enclosed space (26), being kept in a generally planar shape, or being curved to generally conform to the combined shape of the comfort (44) and cuddle (16) surfaces.

37 Claims, 2 Drawing Sheets

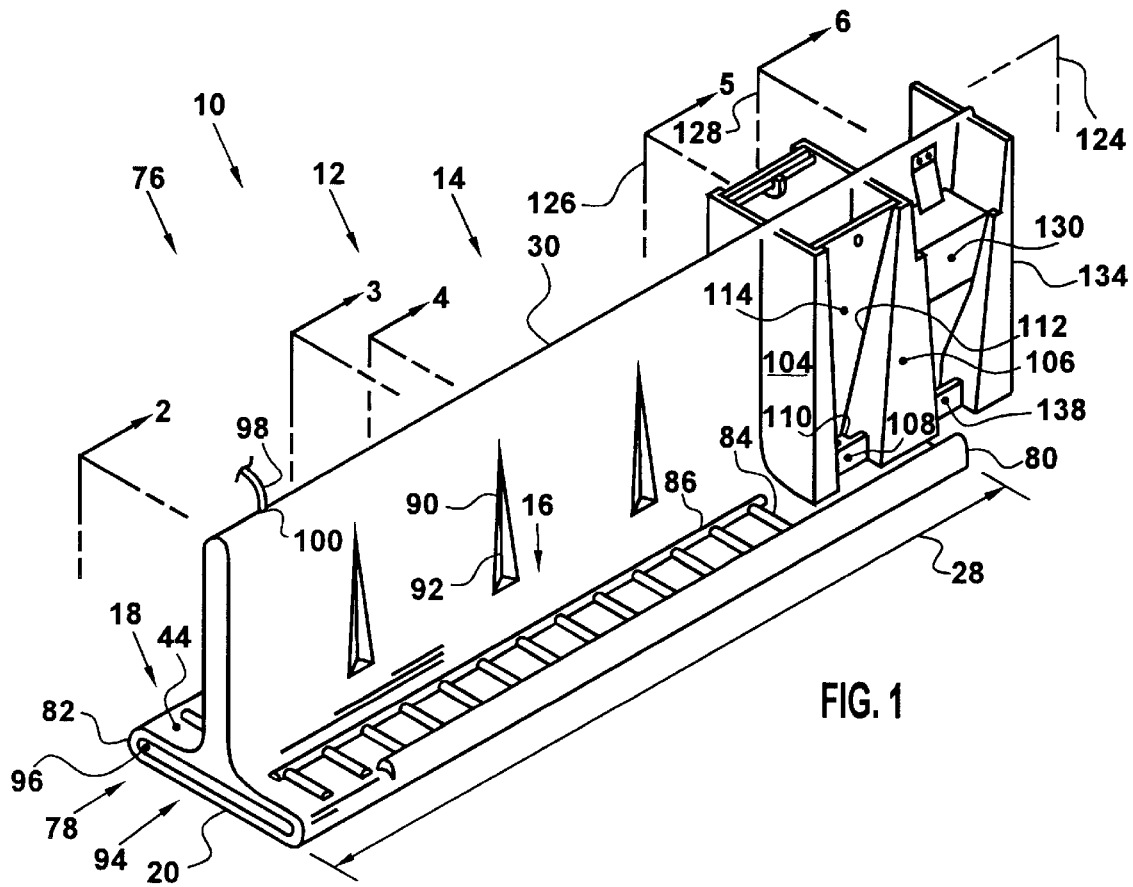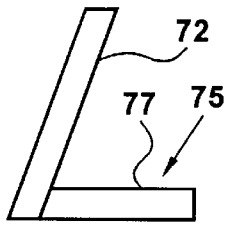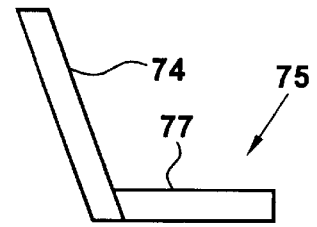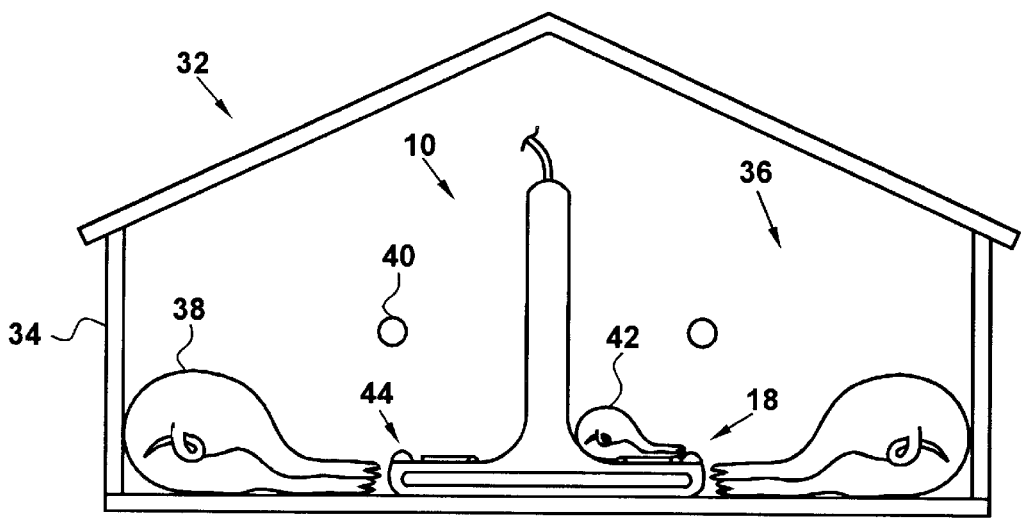

PIG RAISING APPARATUS WITH HEATED CUDDLE AND COMFORT SURFACES

BACKGROUND OF THE INVENTION

The present invention relates generally to apparatus and method for raising baby pigs. More particularly, the present invention pertains to apparatus and method for using heated comfort and cuddle surfaces to entice baby pigs to rest and sleep at a safe distance from a sow.

FIELD OF THE INVENTION

In animal husbandry, raising hogs has become an industry in which sows are confined in close quarters with their baby pigs, and both the food and the environment are closely controlled to maximize weight gain of the pigs and early return of the sow to the production of another liter of baby pigs. The close confinement of sow and pigs, from litter to litter, tends to promote disease, sickness, and a high mortality rate unless their quarters, and all equipment used in their quarters, can be cleaned and disinfected.

In order to maximize milk production, the sow needs an environmental temperature of between 15.6 and 20 degrees Celsius (60 to 68 degrees Fahrenheit). In contrast, the little pigs need an environmental temperature of between 29.4 and 33.3 degrees Celsius (85 and 92 degrees Fahrenheit). If there is no warm area for the baby pigs, they may snuggle close to the sow for warmth and be crushed when the sow turns over. This is a major cause of mortality in baby pigs. On the other hand, they may huddle on top of each other to keep warm, some becoming suffocated.

In raising litters of baby pigs with their sows, typically, a partition is disposed down the middle of the pen, dividing the pen into separate spaces for two sows and their respective litters of baby pigs.

The two sows are restrained to respective resting areas that are proximal to respective sides of the pen by respective ones of bars, or partial partitions. The two litters of baby pigs are able to cross under respective ones of the bars to nurse from their sow, and then they can return to a safe area proximal to the partition.

However, after nursing, they may cuddle close to the sow to obtain warmth and subsequently be crushed to death when the sow turns over. Prior-art designs have recognized this fact. One prior-art solution to this problem has been to provide pig mats on each side of the partition, and then to heat the pig mats.

The present invention provides a partition with a heated cuddle surface on each side. The heated cuddle surfaces entice the baby pigs to cuddle up, rest, and sleep in a safe area that is as far away from their respective sows as possible. By providing more contact area with each baby pig than can be achieved with a pig mat, the cuddle surfaces provide more enticement away from the warmth of the sows. Further, by providing a surface that slopes upwardly, a drier and more comfortable surface is provided.

SUMMARY OF THE INVENTION

Apparatus for use in raising baby pigs includes an elongated partition of molded plastic with first and second elongated cuddle surfaces that are disposed on opposite sides of the partition, and first and second pig blankets that are integral with the partition and that include first and second comfort surfaces.

A base mat that is disposed under both the partition and the pig mats cooperates with first and second cuddle walls of the partition to enclose a space that extends under both pigs mats with their respective comfort surfaces, and that extends upwardly between both cuddle walls and their respective cuddle surfaces.

A radiant panel heater, or a plurality of radiant panel heaters, is disposed in the enclosed space. Preferably, the radiant panel heater has a uniform watt density per square meter, so that the heater may be juxtaposed against a surface of the molded plastic.

Heat from the heater, or heaters, is transmitted by conduction through the cuddle walls to the cuddle surfaces, and heat is transmitted by conduction through the pig mats to comfort surfaces. And, heat is transmitted by conduction to baby pigs that cuddle against a cuddle surface and/or lie on a comfort surface.

In a first aspect of the present invention, a method is provided for enticing baby pigs to rest at a safe distance from a sow, which method comprises restraining the sow to a rest area; allowing the baby pigs to enter and exit the rest area; providing a horizontally-disposed pig mat with a comfort surface that is at the safe distance from the sow; extending a cuddle wall with a cuddle surface upwardly from the pig mat at an even safer distance from the sow; conductively heating the cuddle surface through the cuddle wall; isolating the conductive heating step from ambient air; and warming the baby pigs by conductive heat transfer as the baby pigs cuddle against the cuddle surface.

In a second aspect of the present invention, a method is provided for nurturing baby pigs, which method comprises restraining first and second sows to respective ones of first and second rest areas that are proximal to first and second walls of a pen; disposing a partition intermediate of the walls that includes a cuddle surface on each side of the partition; juxtaposing first and second pig mats against the partition, intermediate of the partition and respective ones of the sows, and at safe distances from respective ones of the sows; and heating the cuddle surfaces to entice first and second litters of the baby pigs to rest lying against the partition.

In a third aspect of the present invention, a method is provided for keeping a sow from lying on and crushing baby pigs, which method comprises restraining the sow to a rest area; allowing the baby pigs to enter and leave the rest area; providing a cuddle wall with a cuddle surface that is disposed outside of the rest area; heating the cuddle surface; and isolating the heating step from ambient air.

In a fourth aspect of the present invention, apparatus is provided for enticing baby pigs to rest in an area safe from being crushed by a sow, which apparatus comprises an elongated cuddle wall that includes an elongated cuddle surface; means, including an electric heater, for conductively heating the elongated cuddle surface; and means, including the electric heater being disposed between the elongated cuddle surface and an other elongated cuddle surface, for isolating the electric heater from the baby pigs and from ambient air.

In a fifth aspect of the present invention, apparatus is provided for use in raising baby pigs, which apparatus comprises means, including an elongated partition having first and second elongated cuddle surfaces that are disposed on opposite sides of the partition, for separating two litters of the baby pigs; and means, including an electric heater that is disposed intermediate of the cuddle surfaces, for conductively heating the cuddle surfaces.

In a sixth aspect of the present invention, apparatus is provided for use in raising baby pigs, which apparatus comprises an elongated partition having first and second elongated cuddle surfaces that are disposed on opposite sides of the partition; first and second pig blankets having first and second comfort surfaces, and being molded integrally with the partition; and means, being disposed internally, for conductively heating both of the cuddle surfaces and both of the comfort surfaces.

BRIEF DESCRIPTION OF THE DRAWINGS

FIG. 1 is an isometric view of the pig raising apparatus of the present invention;

FIG. 2 is an end elevation of the pig raising apparatus of FIG. 1, taken substantially as shown by Section Plane 2 of FIG. 1, showing, in reduced scale, both the apparatus of FIG. 1 and its use in a pig pen;

FIG. 7A is a cuddle wall with a planar cuddle surface that is disposed at 70 degrees to a pig mat;

FIG. 7B is a cuddle wall with a planar cuddle surface that is disposed at 110 degrees to a pig mat.

DESCRIPTION OF THE PREFERRED EMBODIMENTS

Figure 3:
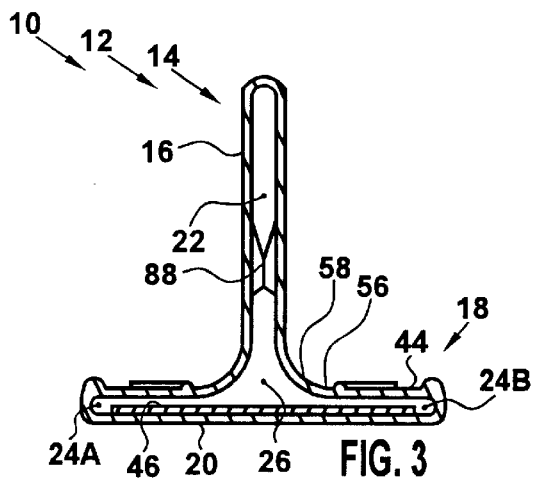
FIG. 3 is a cross section, taken substantially as shown by Section Plane 3 of FIG. 1, with a radiant panel heater disposed horizontally under both pig mats.

Referring now to FIGS. 1 and 3, pig raising apparatus 10 includes an elongated partition 12 having spaced-apart and elongated cuddle walls 14 that each include an elongated cuddle surface 16, a pair of spaced-apart pig mats, or pig blankets, 18 that are each molded integrally with the partition 12, and a base mat 20 that extends under the partition 12 and the pig mats 18.

The cuddle walls 14, being spaced apart, enclose a space 22 therebtween. In like manner, the base mat 20 cooperates with one of the pig mats 18 to enclose a space 24A therebetween, and the base mat 20 cooperates with the other pig mat 18 to enclose a space 24B therebetween. Further, as shown in FIG. 3, both of the cuddle walls 14, both of the pig mats 18, and the base mat 20 cooperate to enclose a space 26. As can be seen by inspection of the drawings, the spaces 22, 24A, 24B, and 26 have areas as shown, and lengths that correspond to a length 28.

Considering only one of the pig mats 18 and only one of the cuddle walls 14, the other cuddle wall 14 is a back wall that cooperates to enclose the space 22.

The back wall 14 provides means for isolating an electric heater, or radiant panel heater, 52 from ambient air outside the pig raising apparatus 10. Further, the back wall 14 includes a back surface 16, and disposing the heater 52 between the two surfaces 16 provides means for isolating the heater 52 from ambient air.

As indicated in FIG. 1, the cuddle walls 14 extend to a top 30 of the partition 12, but the cuddle surfaces 16 include only a lower portion of the cuddle walls 14.

Referring now to FIG. 2, in use, the apparatus 10 is placed in a pen 32 that includes side walls 34. The apparatus 10, among other uses, serves to divide the pen 32 into compartments, or rest areas, 36. Two sows 38 are disposed in the pen 32 proximal to separate ones of the side walls 34, and the sows 38 are restrained proximal to the side walls 34 by rails, or partial partitions, 40. Baby pigs 42 can move under the rails 40 to nurse from their respective sows 38, and then move back to horizontally-disposed planar comfort surfaces 44 that are provided by respective ones of the pig mats 18.

Referring now to FIG. 3, the apparatus 10 includes an electric heater, or a radiant panel heater, 46 that is disposed horizontally in the space 26, thereby heating both of the cuddle walls 14 with their cuddle surfaces 16, in addition to heating both of the pig mats 18 with their comfort surfaces 44.

Figure 4:
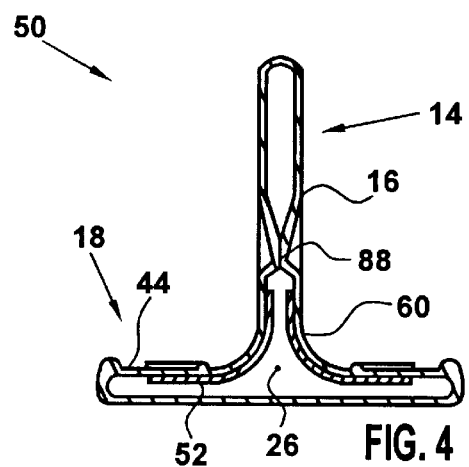
FIG. 4 is a cross section, taken substantially as shown by Section Plane 4 of FIG. 1, taken substantially through one reinforcing weld, and showing the pig raising apparatus with two radiant panel heaters each curved against respective ones of cuddle and comfort surfaces.

Referring now to FIG. 4, in a preferred embodiment, apparatus 50 includes two of the electric heaters, or radiant panel heaters, 52 that are juxtaposed under respective ones of the pig mats 18, and then curve upwardly, and are juxtaposed against respective ones of the cuddle walls 14. The embodiment of FIG. 4 has the advantage of conducting heat directly through the pig mats 18 to their comfort surfaces 44, and directly through the cuddle walls 14 to their cuddle surfaces 16, thereby more directly and efficiently warming the baby pigs 42 of FIG. 2, as opposed to warming the cuddle through air in the space 26.

Referring now to FIGS. 2–4, heat is transmitted by conduction, from the heaters, 46 or 52, through the cuddle walls 14 to the cuddle surfaces 16, and through the pig mats 18 to the comfort surfaces 44. As baby pigs 42 lie on the comfort surfaces 44 and cuddle against the cuddle surfaces, 16, heat is transmitted by conduction into the baby pigs 42.

Heating the comfort surfaces 44 provides a warm place for the baby pigs 42 to rest and sleep after being fed, whereas, otherwise, they would tend to stay close to the sows 38 of FIG. 2 for warmth, and run the risk of being crushed to death when the sows 38 turn over.

The present invention includes means for enticing baby pigs 42 to rest and sleep as far away from the sows 38 as possible, thereby further decreasing mortality from crushing. This means for enticing the baby pigs 42 includes heating the cuddle surfaces 16, and the enticing means further includes concavely contouring the cuddle surfaces 16, as shown in FIG. 1.

For purposes of understanding the appended claims, it is important to distinguish clearly between the comfort surfaces 44 of the pig mats 18 and cuddle surfaces, such as the cuddle surfaces 16 of the cuddle walls 14.

As defined herein, the comfort surface 44 must be horizontally disposed, or be so near to horizontal that the baby pig 42 can lie on it without sliding down to a lower portion thereof. In contrast, the cuddle surface 16, or at least a portion thereof, must be inclined at an angle so steep that the baby pig 42 can lie against that portion, but cannot lie on that portion without sliding down to a lower portion thereof toward a comfort surface, such as the comfort surface 44. Referring again to FIG. 1, the pig mats 18 and their comfort surfaces 44 are both substantially planar, and are horizontally disposed, as shown. Thus, the baby pigs 42 of FIG. 2 lie on the comfort surfaces 44 of the pig mat 18, but they cannot cuddle against the comfort surfaces 44, because they are horizontally disposed.

In contrast to the comfort surfaces 44, as shown in FIG. 1, the cuddle surfaces 16 are concavely curved, and each include at least the portion that is too steeply inclined to lie on, because the baby pigs 42 would slide down toward a respective one of the comfort surfaces 44. However, the baby pigs 42 of FIG. 2 can cuddle against the steeply-inclined portion of the respective ones of the cuddle surfaces 16.

As noted previously, preferably, the cuddle surfaces 16 are concavely contoured to maximize surface contact with the baby pigs 42 of FIG. 2, and thereby maximize heat transfer from the cuddle surfaces 16 to the baby pigs 42. As shown in FIG. 3, when concavely curved, the cuddle surfaces 16 may, at an elongated edge 56, be generally tangent to the comfort surface 44 of the pig mat 18, and then curve upwardly. Thus, the baby pigs 42 may lie on an elongated portion 58 of the cuddle surface 16 that is more or less horizontally-disposed, but also they may cuddle against an elongated portion 60 of the cuddle surface 16 that slopes steeply upward.

Although in a preferred configuration the cuddle surfaces 16 are concavely curved to maximize contact with the baby pigs 42 of FIG. 2, as shown in FIGS. 7A and 7B, cuddle surfaces 72 and 74 are planar. The cuddle surface 72 is sloped upward at 70 degrees from a pig mat 75, and the cuddle surface 74 is slope upward, and away from the pig mat 75 at 110 degrees. Thus, the cuddle surface 72 or 74 may bend or curve, not only upwardly from the pig mat 75, but even bend or curve toward or away from the pig mat 75.

Whether the cuddle surfaces 16, 72, or 74 are curved or planar, the baby pigs 42 of FIG. 2 lie against the cuddle surfaces 16, 72, or 74. In contrast, the baby pigs 42 lie on the comfort surface 44 or a comfort surface 77.

Therefore, the primary distinction between the comfort surfaces 44 or 77 and the cuddle surfaces 16, 72, or 74 is that at least a longitudinally-disposed portion of the cuddle surface 16, 72, or 74 must be sloped at an angle sufficient for the baby pigs 42 of FIG. 2 to lie against, and must be too steep for the baby pigs 42 to lie on.

Referring now to FIGS. 1–4, the apparatus 10 includes a unitary molded housing 76 that is molded from polyethylene by a process that is called rotational molding. In the rotational molding process, powder or granules of polyethylene are placed into a heated metallic mold, and then the mold is rotated alternately around two different axes, thereby depositing a layer of molten plastic on all internal surfaces of the metallic mold.

Thus, the housing 76 includes the cuddle walls 14, the pig mats 18, the base mat 20, and ends 78 that cooperate to provide the enclosed space 26, and the enclosed space 26 includes the enclosed spaces 22, 24A, and 24B.

The housing 76 includes side rails, or longitudinal guard rails, 80 that extend upwardly from an outer edge 82 of each of the pig mats 18. The side rails 80 tend to keep the baby pigs 42 of FIG. 2 on the comfort surfaces 44 as they sleep. The housing 76 also includes a plurality of spaced-apart traction bars, or transverse traction ridges, 84 which rise above the planar comfort surfaces 44 of the pig mats 18. The traction bars 84 assist the baby pigs 42 in positioning themselves on the comfort surfaces 44.

The housing 76 also includes a pair of inner rails 86 that are juxtaposed against the traction bars 84, but that are a part of the cuddle wall 14. The inner rails 86 cooperate with the concave shape of the cuddle wall 14 to further cradle the baby pigs 42 of FIG. 2, in and against the cuddle surface 16. As shown in FIGS. 3 and 4, the housing 76 further includes wall reinforcing welds 88. As shown in FIGS. 1–4, the reinforcing welds 88 result from recesses 90 placing the cuddle walls 14 so close together that the cuddle walls 14 are molded as a unitary wall 92 at the recesses 90.

A lower portion 94 of one of the ends 78 is cut off, preferably by sawing, to allow insertion of the radiant panel heater 46, or a pair of the radiant panel heaters 52. After insertion of a heater, 46 or 52, the cut end 78 is closed, preferably by inserting a plug 96, as shown in FIG. 1. A power cord 98 is extended upwardly from the heater, 46 or 52, and out through a hole 100 in the top 30 of the partition 12.

Figure 5:
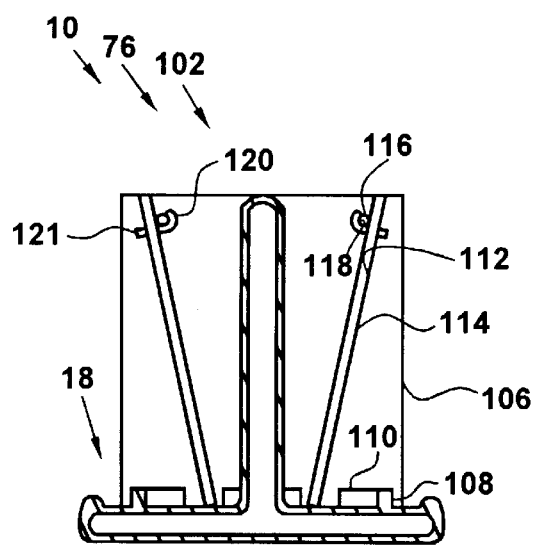
FIG. 5 is a cross section, taken substantially as shown by Section Plane 5 of FIG. 1, showing construction of a feed dispensing device that is optional.

Referring now to FIGS. 1 and 5, in the embodiment shown in FIGS. 1–3, 5, and 6, the apparatus 10, and the unitary molded housing 76 thereof, includes a pair of granulated feed dispensers 102. Each granulated feed dispenser 102 includes integrally-molded side walls 104 and 106, a bowl front, or longitudinally-disposed portion, 108 that extends between the side walls 104 and 106 and upwardly from the pig mats 18, a bowl divider 110 that extends inwardly from the bowl front 108, and sloping wall ridges 112 that are a part of the side walls 104 and 106, and that provide a guide and support surface for a bin door 114.

The bin door 114 is made from a sheet of any suitable plastic material. The bin door 114 is installed by sliding it downwardly between the sloping wall ridges 112 and a steel rod 116 that is inserted into holes 118. The bin door 114 is retained by a latch projection 120 which, in the preferred embodiment, is a blind rivet. To remove the bin door 114, the bind door 114 is deflected inwardly to allow the latch projection 120 to upwardly pass the steel rod 116.

Figure 6:
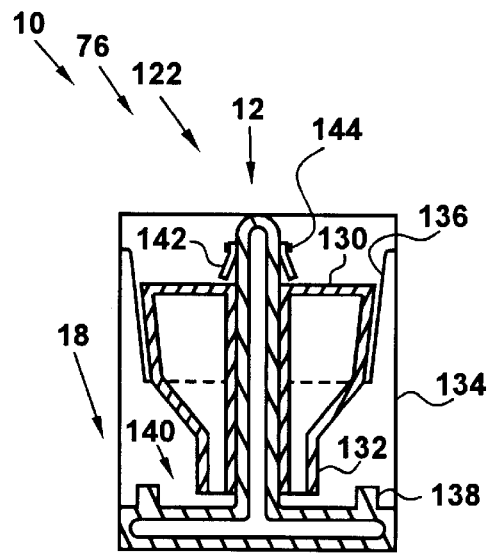
FIG. 6 is a cross section, taken substantially as shown by Section Plan 6 of FIG. 1, showing construction of a watering device that is optional.

Referring to FIGS. 1 and 6, each of two drink dispensers, or water dispensers, 122 includes a water bottle 130 with a neck 132, the integrally-molded side wall 106, a third integrally-molded side wall 134, shaped projections 136 of the side walls 106 and 134 that both guide and support one of the water bottles 130 in a neck-down position, and a basin front, or longitudinally-disposed portion, 138 that extends upwardly from a respective one of the pig mats 18, between the side walls 106 and 134, to form a drinking basin 140.

The neck 132 of the water bottle 130 extends downwardly below the basin front 138, thereby establishing an automatic water level. A spring latch 142, that is attached to the partition 12 by a self-tapping screw 144, releasably retains the water bottle 130.

The construction of the feed dispensers 102, the drink dispensers 122, and other details of the apparatus 10 can be more easily understood by considering that: the unitary molded housing 76 is symmetrical about a vertical plane 124 that extends longitudinally, the feed dispensers 102 are symmetrical about a vertical plane 126 that extends transversely through the latch projection 120, and the drink dispensers 122 are symmetrical about a vertical plane 128 that extends transversely through the spring latch 142.

Figure 8:
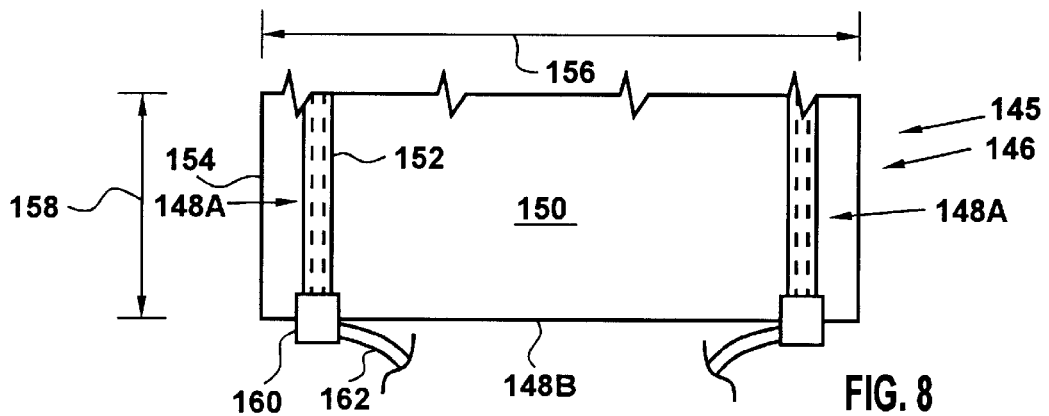
FIG. 8 is a plan view of a radiant panel heater used in the present invention.

Referring now to FIG. 8, the electric heater 46 or 52 includes a nonconducting matrix 146 that is rectangular in shape, with pairs of first edges 148A and second edges 148B. Preferably, this nonconducting matrix 146 is a sheet of fiberglass cloth that is 0.01778 cm. (0.007 inches) thick. Graphite impregnation of the nonconducting matrix 146 produces the electric heater 46 or 52 with a substantially uniform watt density over a planar heat-radiating surface 150.

A pair of copper ribbons, or conductive ribbons, 152 that are 0.02032 cm. (0.008 inches) thick and 1.27 cm. (0.5 inches) wide, are sewn or stitched to respective ones of the first pair of edges 148A, thereby providing two separate electrical contacts with the electric heater 46 or 52. Then the electric heater 46 or 52 and the conductive ribbons 152 are encapsulated between sheets of polyester and polyethylene film or plastic sheets, 154.

Since the electric heater 46 or 52 has a uniform watt density per unit area, if a distance 156 between the first pair of edges 148A is kept constant, and a length 158 of the edges 148A is increased, the watt density remains constant, but the total wattage of the electric heater 46 or 52 increases as a direct function of the length 158.

Preferably, the electric heater 46 or 52 has a watt density of 700 to 1000 watts per square meter (63.03 to 92.90 watts per square foot). A suitable material is manufactured by Flexel International Ltd. in Glenrothres, Fife, Scotland under the trade name Thermotex or Flexel.

As shown in FIG. 8, contacts are made with the conductive ribbons 152 by electrical clips, or electric terminals, 160 that are crimped to both the conductive ribbons 152 and wires 162.

While specific apparatus and method have been disclosed in the preceding description, and while part numbers have been inserted parenthetically into the claims to facilitate understanding of the claims, it should be understood that these specifics have been given for the purpose of disclosing the principles of the present invention and that many variations thereof will become apparent to those who are versed in the art. Therefore, the scope of the present invention is to be determined by the appended claims, and without any limitation by the part numbers inserted parenthetically in the claims.

INDUSTRIAL APPLICABILITY

The present invention is applicable to nurturing pigs, other domestic or wild animals, and/or fowl on farms, in zoos, and in animal preserves.

What is claimed is:

1. A method for enticing baby pigs to rest at a safe distance from a sow, which method comprises:
   a) restraining said sow to a rest area;
   b) allowing said baby pigs to enter and exit said rest area;
   c) providing a horizontally-disposed pig mat with a comfort surface that is at said safe distance from said sow;
   d) extending a cuddle wall with a cuddle surface upwardly from said pig mat at an even safer distance from said sow;
   e) conductively heating said cuddle surface through said cuddle wall;
   f) isolating said conductive heating step from ambient air; and
   g) warming said baby pigs by conductive heat transfer as said baby pigs cuddle against said cuddle surface.

2. A method as claimed in claim 1 in which said method further comprises conductively heating said comfort surface through said pig mat.

3. A method as claimed in claim 2 in which:
   a) said steps of providing and extending comprise molding a base mat, molding said pig mat above said base mat that includes said comfort surface, molding said cuddle wall with said cuddle surface, molding a back wall behind said cuddle wall, and molding a space between said base mat and said pig mat that extends between said cuddle wall and said back wall;
   b) said conductive heating steps comprise disposing a radiant panel heater in said space and contouring said radiant panel heater with one portion thereof disposed proximal to said pig mat and another portion thereof curved upwardly toward said cuddle wall; and
   c) said isolating step comprises said molding of said space.

4. A method as claimed in claim 2 in which:
   a) said method further comprises providing a second comfort surface that is spaced apart from the first said comfort surface, extending a second cuddle surface upwardly from said second comfort surface, and enclosing a space that extends under both of said comfort surfaces and between both of said cuddle surfaces;
   b) said step of providing said second comfort surface comprises providing a second pig mat having said second comfort surface;
   c) said steps of extending said cuddle surfaces comprise disposing a partition with said cuddle walls being spaced-apart between said pig mats;
   d) said enclosing step comprises disposing a base mat beneath said partition and both of said pig mats;
   e) said heating steps comprise enclosing a radiant panel heater in said enclosed space intermediate of said base mat and one of said pig mats, and contouring said radiant panel heater upwardly toward the adjacent one of said cuddle walls; and
   f) said isolating step comprises disposing said radiant panel heater in said enclosed space.

5. A method as claimed in claim 2 in which said method further comprises heating said surfaces with a radiant panel heater having a uniform watt density per square meter.

6. A method as claimed in claim 1 in which said method further comprises concavely contouring said cuddle surface.

7. A method as claimed in claim 6 in which said method further comprises forming a plurality of transverse traction ridges on said comfort surface.

8. A method as claimed in claim 7 in which, said method still further comprises forming a longitudinal guard rail on said comfort surface proximal to an edge thereof that is distal from said cuddle surface.

9. A method as claimed in claim 1 in which said method further comprises:
   a) exposing said sow and said baby pigs to a first temperature; and
   b) said step of conductively heating said cuddle surface comprises heating said cuddle surface to a temperature that is higher than said first temperature.

10. A method as claimed in claim 1 in which said steps of providing and extending comprise integrally molding said pig mat and said cuddle wall.

11. A method as claimed in claim 1 in which:
    a) said isolating step comprises enclosing a space behind said cuddle surface; and
    b) said conductive heating step comprises providing heat from inside said enclosed space.

12. A method as claimed in claim 1 in which:
    a) said isolating step comprises enclosing a space that extends under said comfort surface and behind said cuddle surface; and
    b) said conductive heating step comprises providing heat from inside said enclosed space.

13. A method as claimed in claim 1 in which:
    a) said steps of providing and extending comprise molding a base mat, molding said pig mat above said base mat that includes said comfort surface, molding a first space between said base mat and said pig mat, molding said cuddle wall with said cuddle surface, molding a back wall behind said cuddle wall, and molding a second space between said back wall and said cuddle wall;

b) said step of conductively heating said cuddle surface comprises providing heat from inside one of said space; and c) said isolating step comprises said molding of one of said spaces.

14. A method as claimed in claim 1 in which:

a) said method further comprises providing a second comfort surface that is spaced apart from the first said comfort surface, extending a second cuddle surface upwardly from said second comfort surface, enclosing a space that extends under both of said comfort surfaces and between said cuddle surfaces;

b) said conductive heating step comprises heating said first cuddle surface from inside said enclosed space; and c) said isolating step comprises said enclosing of said space.

15. A method as claimed in claim 1 in which:

a) said steps of providing and extending comprise molding a base mat, molding said pig mat above said base mat that includes said comfort surface, molding said cuddle wall with said cuddle surface, molding a back wall behind said cuddle wall, and molding a space between said base mat and said pig mat that extends between said cuddle wall and said back wall;

b) said step of conductively heating said cuddle surface comprises disposing a radiant panel heater inside said space; and c) said isolating step comprises said disposing of said radiant panel heater inside said space.

16. A method for nurturing baby pigs, which method comprises:

a) restraining first and second sows to respective ones of first and second rest areas that are proximal to first and second walls of a pen;

b) disposing a partition intermediate of said walls that includes a cuddle surface on each side of said partition;

c) juxtaposing first and second pig mats against said partition, intermediate of said partition and respective ones of said sows, and at safe distances from respective ones of said sows; and d) heating said cuddle surfaces from within said partition to entice first and second litters of said baby pigs to rest lying against said partition.

17. A method as claimed in claim 16 in which said method further comprises concavely contouring said cuddle surfaces.

18. A method as claimed in claim 16 in which said heating step comprises using a radiant panel heater with a uniform watt density per square meter.

19. A method as claimed in claim 16 in which said method still further comprises adapting a longitudinally-disposed portion of said partition to provide a drinking basin.

20. A method as claimed in claim 16 in which said method still further comprises adapting a longitudinally-disposed portion of said partition to provide a feed dispenser.

21. A method as claimed in claim 16 in which:

a) said method comprises concavely contouring said cuddle surfaces;

b) said heating step comprises using a radiant panel heater with a uniform watt density per square meter;

c) said method further comprises adapting a longitudinally-disposed portion of said partition to provide a water dispenser; and d) said method still further comprises adapting another longitudinally-disposed portion of said partition to provide a fed dispenser.

22. A method for keeping a sow from lying on and crushing baby pigs, which method comprises:

a) restraining said sow to a rest area;

b) allowing said baby pigs to enter and leave said rest area;

c) providing a cuddle wall with a cuddle surface that is disposed outside of said rest area;

d) heating said cuddle surface; and e) isolating said heating step from ambient air.

23. A method as claimed in claim 22 in which said method further comprises concavely contouring said cuddle surface.

24. A method as claimed in claim 22 in which said heating step comprises:

a) enclosing a space behind said cuddle surface; and b) heating said cuddle surface from within said enclosed space.

25. Apparatus (10) for enticing baby pigs (42) to rest in an area (36) safe from being crushed by a sow (38), which apparatus comprises:

an elongated cuddle wall (14) that includes an elongated cuddle surface (16);

means, comprising an electric heater, (46 or 52 for conductively heating said elongated cuddle surface; and means, comprising said electric heater being disposed between said elongated cuddle surface and an other elongated cuddle surface (16), for isolating said electric heater from said baby pigs and from ambient air.

26. Apparatus (10) as claimed in claim 25 in which said means for isolating said electric heater (46 or 52) from said baby pigs (42) and said ambient air further comprises:

means (12) for enclosing a space (26) behind said elongated cuddle surfaces (16); and disposing said electric heater within said enclosed space.

27. Apparatus (10) as claimed in claim 25 in which said apparatus further comprises:

a pig blanket (18) that is juxtaposed against said cuddle wall (14) and that includes a comfort surface (44); and means (46 or 52) for heating said comfort surface.

28. Apparatus (10) as claimed in claim 27 in which said apparatus comprises means (12) for enclosing a space (26) beneath said comfort surface (44); and said means for heating said comfort surface comprises means (46 or 52) for heating said comfort surface from within said enclosed space.

29. Apparatus (10) as claimed in claim 27 in which said apparatus further comprises:

means, comprising an other wall (14) that is disposed behind said cuddle wall (14) and that includes said other elongated surface (16), for enclosing a space (22) between said elongated surfaces (16);

means, comprising a base mat (20) that is disposed under and spaced apart from a pig mat (18), for enclosing an other space (24A or 24B) beneath said comfort surface (44); and said means for conductively heating said elongated cuddle surface (16) comprises said electric heater (46 or 52), being disposed within one of said enclosed spaces.

30. Apparatus (10) as claimed in claim 29 in which said apparatus, including said base mat (20), said pig mat (18), and said cuddle wall (14), is integrally-molded plastic.

31. Apparatus (10) for use in raising baby pigs (42), which apparatus comprises:

means, comprising an elongated partition (12) having first and second elongated cuddle surfaces (16) that are disposed on opposite sides of said partition, for separating two litters of said baby pigs; and means, comprising an electric heater (46 or 52) that is disposed intermediate of said cuddle surfaces, for conductively heating said cuddle surfaces.

32. Apparatus (10) as claimed in claim 31 in which said elongated partition (12) includes first and second cuddle walls (14) having said first and second cuddle surfaces (16) that enclose a space (26) therebtween; and said means for heating said cuddle surfaces comprises said electric heater (46 or 52) being disposed in said enclosed space.

33. Apparatus (10) for use in raising baby pigs (42), which apparatus comprises:

an elongated partition (12) having first and second elongated cuddle surfaces (16) that are disposed on opposite sides of said partition;

first and second pig blankets (18) having first and second comfort surfaces (44), and being molded integrally with said partition; and means (46 or 52), being disposed internally, for conductively heating both of said cuddle surfaces and both of said comfort surfaces.

34. Apparatus (10) as claimed in claim 33 in which said means for heating said surfaces (16 and 44) comprises:

means, comprising a base mat (20), and comprising said partition (12) having first and second cuddle walls (14) with said first and second cuddle surfaces (16), for enclosing a space (26) under both of said pig blankets (18) and between both of said cuddle surfaces; and said means for heating both of said cuddle surfaces and both of said comfort surfaces (44) comprises an electric heater (46 or 52) disposed in said enclosed space.

35. Apparatus (10) as claimed in claim 34 in which said apparatus comprises means (122) for providing drinking water on both sides of said partition (12).

36. Apparatus (10) as claimed in claim 35 in which said apparatus comprises means (102) for dispensing feed on both sides of said partition (12).

37. Apparatus (10 as claimed in claim 33 in which one of said elongated cuddle surfaces (16) is concavely contoured.

\* \* \* \* \*

UNITED STATES PATENT AND TRADEMARK OFFICE
CERTIFICATE OF CORRECTION

PATENT NO. : 5,832,875
DATED : 10 November 1998
INVENTOR(S) : Carl W. Van Gilst

It is certified that error appears in the above-indentified patent and that said Letters Patent is hereby corrected as shown below:

In column 4, --walls 14-- should be inserted between "cuddle" and "through" in line 28; and --comfort surfaces, such as-- should be inserted between "between" and "the" in line 48. In column 6, "bind" should be --bin-- in line 28. In Claim 8, the comma after "which" should be deleted in line 36. In Claim 13, "space" should be --spaces-- in line 6. In Claim 21, "fed" should be --feed-- in line 6. In Claim 24, "22" should be --23-- and "which said heating" should be --which: a) said isolating-- in line 18; "comprises: a) enclosing" should be --comprises enclosing-- in lines 19 and 20; and "heating said" should be --said heating step comprises conductively heating said-- and "surface from" should be --surface through said cuddle wall from-- in line 21.

Signed and Sealed this

Twenty-fifth Day of May, 1999

Attest:

Q. TODD DICKINSON

*Attesting Officer*     Acting Commissioner of Patents and Trademarks